(12) United States Patent
Anderson et al.

(10) Patent No.: US 9,301,508 B2
(45) Date of Patent: Apr. 5, 2016

(54) POULTRY LOADING ASSEMBLY

(71) Applicants: Joshua Dean Anderson, Marshall, MN (US); Douglas Dean Anderson, Marshall, MN (US)

(72) Inventors: Joshua Dean Anderson, Marshall, MN (US); Douglas Dean Anderson, Marshall, MN (US)

(*) Notice: Subject to any disclaimer, the term of this patent is extended or adjusted under 35 U.S.C. 154(b) by 28 days.

(21) Appl. No.: 14/242,436

(22) Filed: Apr. 1, 2014

(65) Prior Publication Data
US 2015/0272086 A1 Oct. 1, 2015

(51) Int. Cl.
*B65G 15/26* (2006.01)
*A01K 45/00* (2006.01)
*B65G 41/00* (2006.01)

(52) U.S. Cl.
CPC ............ *A01K 45/005* (2013.01); *B65G 41/003* (2013.01)

(58) Field of Classification Search
CPC ... A01K 45/005; B65G 41/003; B65G 41/005
USPC .................................. 198/313, 435
See application file for complete search history.

(56) References Cited

U.S. PATENT DOCUMENTS

| | | |
|---|---|---|
| 3,253,577 A | 5/1966 | Lund |
| 3,389,690 A | 6/1968 | Jerome |
| 3,389,780 A | 6/1968 | Jerome |
| 3,420,211 A | 1/1969 | Hartvickson |
| 3,452,718 A | 7/1969 | Wight |
| 3,476,089 A | 11/1969 | Jerome |
| 3,702,600 A * | 11/1972 | Bright et al. ................... 119/846 |
| 3,722,477 A | 3/1973 | Weldy et al. |
| 3,958,536 A | 5/1976 | Crowder |
| 4,074,658 A | 2/1978 | Mermelstein et al. |
| 5,325,820 A | 7/1994 | Briggs et al. |
| 5,469,815 A | 11/1995 | Stross |
| 5,699,755 A | 12/1997 | Wills et al. |
| 5,706,765 A | 1/1998 | Horton |
| 5,743,217 A | 4/1998 | Jerome |
| 5,902,089 A * | 5/1999 | Sinn et al. ...................... 414/398 |
| 5,915,338 A | 6/1999 | Fitzsimmons et al. |
| 6,109,215 A | 8/2000 | Jerome |
| 6,347,604 B1 | 2/2002 | Lapere et al. |
| 6,447,234 B2 | 9/2002 | Sinn et al. |
| 6,454,510 B1 | 9/2002 | Sinn et al. |
| 6,564,751 B2 | 5/2003 | Anderson et al. |
| 6,880,488 B1 | 4/2005 | Hall |
| 6,976,454 B2 | 12/2005 | Cattaruzzi |
| 7,281,496 B2 | 10/2007 | Calabria et al. |
| 7,849,820 B1 * | 12/2010 | Anderson et al. ............. 119/846 |
| 8,176,879 B1 * | 5/2012 | Anderson et al. ............. 119/846 |
| 9,055,734 B1 * | 6/2015 | Anderson et al. |
| 2002/0015635 A1 | 2/2002 | Sinn et al. |
| 2004/0050653 A1 | 3/2004 | Mola |

* cited by examiner

*Primary Examiner* — William R Harp (57) ABSTRACT

A poultry loading assembly includes a primary frame and a chute operationally coupled to the primary frame. A primary scissor is operationally coupled between the primary frame and the chute and is actuated to lower or lift the chute. A first conveyor belt is rotatably mounted on the chute and receiving poultry thereon proximate a loading area. A head is operationally coupled to the chute opposite the loading area and is continuously retained in a parallel orientation with the support surface. The head is selectively positionable proximate the container and is selectively movable toward or away from a container. A second conveyor belt is operationally coupled to the head. The first conveyor belt transports the poultry to the second conveyor belt and thereafter the second conveyor belt transports the poultry into the container.

11 Claims, 11 Drawing Sheets

POULTRY LOADING ASSEMBLY

BACKGROUND OF THE DISCLOSURE

Field of the Disclosure

The disclosure relates to poultry loading devices and more particularly pertains to a new poultry loading device for loading the poultry into a container.

SUMMARY OF THE DISCLOSURE

An embodiment of the disclosure meets the needs presented above by generally comprising a primary frame. A chute is operationally coupled to the primary frame and is positionable at a selected angle with respect to the primary frame. A primary scissor is operationally coupled between the primary frame and the chute. The primary scissor is actuated to lower or lift the chute. A first conveyor belt is rotatably mounted on the chute and is configured for receiving poultry thereon proximate a loading area. A head is operationally coupled to the chute opposite the loading area. The head is continuously retained in a parallel orientation with the support surface. The head is selectively positionable proximate the container and is selectively movable toward or away from a container. A second conveyor belt is operationally coupled to the head. The first conveyor belt is configured to transport the poultry to the second conveyor belt and thereafter the second conveyor belt is configured to transport the poultry into the container.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 10 thereof, a new poultry loading device embodying the principles and concepts of an embodiment of the disclosure and generally designated by the reference numeral 10 will be described.

As best illustrated in FIGS. 1 through 10, the poultry loading assembly 10 generally comprises a primary frame 12 that is elongated along a line extending between a fore end 14 and a posterior end 16 of the primary frame 12. A plurality of lateral arms 18 of the primary frame 12 are coupled to and extend between each of a pair of longitudinal arms 20 of the primary frame 12. The plurality of lateral arms 18 are spaced apart from each other and distributed between the fore 14 and posterior 16 ends of the primary frame 12. Each of a pair of arms 22 of a V-shaped hitch 24 is coupled to the fore end 14 of the primary frame 12. The V-shaped hitch 24 extends forwardly away from the primary frame 12. Further, the V-shaped hitch 24 may be coupled to a vehicle so the assembly 10 may be transported.

A pair of axles 26 is coupled to a bottom 28 of each of the pair of longitudinal arms 20 of the primary frame 12. Moreover, each of the pair of axles 26 is positioned proximate a middle 30 of the primary frame 12. The pair of axles 26 each extends laterally beyond each of the longitudinal arms 20 of the primary frame 12. Continuing, a plurality of wheels 32 is each rotatably coupled to an associated one of a pair of free ends 32 of an associated one of the pair of axles 26. The primary frame 12 is rolled along a support surface 34 such as a roadway, loading area, earth or like.

A chute 36 is elongated along a line extending between a front end 38 and a back end 40 of the chute 36. The chute 36 has a rectangular parallelepiped shape. The back end 40 of the chute 36 is hingedly coupled to a top 111 of the primary frame 12 proximate the posterior end 16 of the primary frame 12. Moreover, the chute 36 is positionable at a selected angle with respect to the primary frame 12. A shroud 42 is coupled to the chute 36. Further, the shroud 42 covers each of a upper side 44, a first lateral side 46 and a second lateral side 48 of chute 42. Additionally, the shroud 42 extends between the front end 38 and the back end 40 of the chute 36. The shroud 42 may be comprised of a rigid material.

A hood 50 may be coupled to the primary frame 12. The hood 50 is positioned proximate the posterior end 16 of the primary frame 12. Each of a pair of vertical portions 52 of the hood 50 extends upwardly from an associated one of the pair of longitudinal arms 20 of the primary frame 12. A horizontal portion 54 of the hood 50 extends between a top 56 of each of the vertical portions 52 of the hood 50.

At least one, and up to a pair of scissor mounts 58, is hingedly coupled to and extends downwardly from an associated one of the first 46 and second 48 lateral sides of the chute 36. The pair of scissor mounts 58 is positioned proximate the front end 38 of the chute 36. Moreover, the pair of scissor mounts 58 extends downwardly from the chute 36. A top end 60 of each of the pair of scissor mounts 58 is hingedly coupled to an associated one of a pair of top arms 62 extending along the chute 36. Each of a pair of bottom arms 64 of the chute 36 is hingedly coupled to a middle 66 of an associated one of the pair of scissor mounts 58.

It is particularly noted that a parallelogram may formed on each side of the assembly 10 formed by the scissor mounts 58, bottom arms 64 and top arms 62. More specifically, each side includes a parallelogram including one top arm 62, one bottom arm 64, a first line 206 drawn between pivot point 201 and pivot point 202, and a second line 207 drawn between pivot point 203 and pivot point 204. The chute 36 includes bottom arm 64 but is not attached directly to the top arm 62 as the top arm 62 is being utilized to control the orientation of the scissor mount 58. Pivot point 201 denotes the attachment point of the top arm 62 to the primary frame 12 by way of a connection post 205 while pivot point 202 is the connection point of the bottom arm 64 and the primary frame 64. Pivot points 203 and 204 are attachment points, respectively, between the upper arm 62 and lower arm 64 with the scissor mount 58. The scissor mount 58 retains the pivot points 203 and 204 in a fixed spatial relationship and the top arm 62 and bottom arm 64 have a fixed length. Consequently, as the scissors mount 58 is lifted, it is also pulled toward the posterior end 16 of the primary frame. Also, throughout the movement of the chute 36, the first 206 and second lines 207 are retained in an unchanged orientation with respect to each other and this orientation may comprise a parallel orientation. Thus, as the scissor mount 58 is lifted, because the second line orientation is maintained, the scissor mount 58 cannot pivot with respect to the top 62 and bottom 64 arms or pivot with respect to the primary frame 12. This is important for reasons which will become clear below, though it should be noted that while a parallelogram is described herein, the important characteristic is that the first 206 and second 207 lines are retained in a same angular relationship with respect to each other as the chute 36 is lifted and lowered.

A bottom portion 68 of a primary scissor 70 is hingedly coupled to and extends upwardly from an actuator one of the plurality of lateral arms 72 of the primary frame 12. An upper portion 74 of the primary scissor 70 is hingedly to a top 76 of the bottom portion 68 of the primary scissor 70. A primary piston 78 is coupled between the actuator lateral arm 72 of the primary frame 12 and a bottom 80 of the upper portion 74 of the primary scissor 70. The primary piston 78 selectively extends and collapses the primary scissor 70 with respect to the top 42 primary frame 12. Lastly, the primary piston 78 may be a hydraulic piston of any conventional design.

A top mount 82 is coupled to and extends between a top end 84 of each of a pair of arms 86 of the upper portion 74 of the primary scissor 70. The top mount 82 may have a width between 0.75 m and 2.0 m. A bottom end 88 of each of the pair of scissor mounts 58 is movably, that is pivotally, coupled to the top mount 82. Lastly, the primary scissor 70 selectively positions the chute 52 at the selected angle with respect to the primary frame 12.

A drive portion 90 of a first conveyor belt 92 is hingedly coupled to the back end 40 of the chute 36. The drive portion 90 of the first conveyor belt 92 extends rearwardly away from the back end 40 of the chute 36. A central portion 94 of the first conveyor belt 92 is coupled to and extends between each of the pair of bottom arms 64 of the chute 36. Moreover, the central portion 94 of the first conveyor belt 92 extends between the front 38 and back 40 ends of the chute 36.

A forward portion 96 of the first conveyor belt 92 is coupled to and extends forwardly from the front end 38 of the chute 36. Additionally, the first conveyor belt 92 may be a mechanical conveyor belt of any conventional design. A pair of support arms 98 each extends between a bottom end of an associated one of the pair of scissor mounts 58 and the forward portion 96 of the first conveyor belt 92. The forward portion 96 of the first conveyor belt 92 is oriented parallel with the support surface 34 regardless of the selected angle of the chute 36. It should be understood that the first conveyor belt 92 may include one or more conveyor belts wherein the forward portion 96 comprises a single conveyor belt separate from a conveyor belt(s) positioned on the chute 36.

A first belt motor 11 is coupled to the drive portion 90 of the first conveyor belt 92. Additionally, the first belt motor 11 is rotatably coupled to a drive roller 13 of the first conveyor belt 92. The first conveyor belt 92 transports poultry upwardly through the chute 36 when the first belt motor 11 is actuated. Finally, the first belt motor 11 may be a hydraulic motor of any conventional design.

A pair of rollers 15 is each coupled to an associated one of a primary lateral side 17 and a secondary lateral side 19 of the forward portion 96 of the first conveyor belt 92. An outer surface 21 of the pair of rollers 15 may be defined as an inverted V-shape. The pair of rollers 15 comprises a pair of sets of rollers 23. Lastly, each of the pair of sets rollers 23 is positioned proximate an associated one of a forward end 25 and a rearward end 27 of the forward portion 96 of the first conveyor belt 92. A first pair of tracks 29, which may be V-shaped, each engages an associated one of a bottom side 31 and a top side 33 of each of a first set of rollers 35. The first pair of V-shaped tracks 29 moves forwardly and rearwardly along the first set of rollers 35. A second pair of V-shaped tracks 37 each engages an associated one of a bottom side 31 and a top side 33 of each of a second set of rollers 39. The second pair of V-shaped tracks 37 moves forwardly and rearwardly along the second set of rollers 39.

A rear portion 41 of a head 43 comprises a plurality of vertical arms 45 of the rear portion 41 of the head 43 coupled between a plurality of horizontal arms 47 of the rear portion 41 of the head 43. The plurality of vertical 45 and horizontal 47 arms of the rear portion 41 of the head 43 form a frame with a rectangular parallelepiped shape. Additionally, a front portion 49 of the head 43 comprises a plurality of vertical arms 51 of the front portion 49 coupled between a plurality of horizontal arms 53 of the front portion 49 of the head 43. The plurality of vertical 51 and horizontal 53 arms of the front portion 49 of the head 43 also may form a frame with a rectangular parallelepiped shape.

Each of a first lateral section 55 and a second lateral section 57 of the front portion 49 of the head 43 has a height that is greater than a central section 59 of the front portion 49 of the head 43. A basal side 61 of each of the first 55 and second 57 lateral sections of the front portion 49 of the head 43 extends below a lowest side 63 of the central section 59 of the front portion 49 of the head 43. Continuing, a frontal end 65 of the rear portion 41 of the head 43 is coupled to a back side 97 of the front portion 49 of the head 43. The rear portion 41 of the head 43 is centrally located on the front portion 49 of the head 43. Lastly, the front portion 49 of the head 43 has a width that is greater than a width of the rear portion 11 of the head 43.

A plurality of panels 67 is coupled to each of the front 49 and rear 41 portions of the head 43. The plurality of panels 67 completely covers a crowning side 69 and each of a first 71 and a second 73 oblique side of the rear portion 41 of the head 43. Additionally, the plurality of panels 67 completely covers a topmost side 75 of the front portion 49 of the head 43. Continuing, the plurality of panels 67 covers a bottom half 77 of each of the first 55 and second 57 lateral sections of the front portion 49 of the head 43. A top half 79 of each of the first 55 and second 57 lateral sections and a front side 81 of the front portion 49 of the head 43 are uncovered by the plurality of panels 67.

The head 43 is mechanically coupled to the chute 36. Each of the first 29 and second 37 pairs of V-shaped tracks is coupled to the plurality of vertical arms 45 of an associated one of the first 71 and second 73 oblique sides of the rear portion 41 of the head 43. The first 29 and second 37 pairs of tracks extends from a postern end 89 of the rear portion 41 of the head 43 beyond the frontal end 65 of the rear portion 41 of the head 43. Additionally, the head 43 is slidably coupled to the forward portion 96 of the first conveyor belt 92. As with the front portion 62 of the first conveyor belt, the head 43 is continuously maintained at a horizontal orientation throughout the movement of the chute 36. This provides a more stable structure between the head 43 and the chute 36, though such limits the ability to move the head 43 relative to a cage into which birds are moved. As was stated above, the scissors mount 58 is attached to the top 62 and bottom 64 arms such that the orientation of the scissors mount 58 does not change as the chute 36 is lifted and lowered. The head 43 is slidably mounted to the forward portion 96 but the forward portion is fixed with respect to the scissors mount 58. Thus, unlike conventional loaders taught in the art, the head 43 cannot tilt and is retained in its horizontal orientation without usage of additional pistons or other mechanical actuators required for horizontal orientation.

The rear portion 41 of the head 43 completely encloses the forward portion 96 of the first conveyor belt 92. A head piston 91 is coupled between a first one of the pair of scissor mounts 93 and the back side 97 of the front portion 49 of the head 43. The head piston 91 is actuated to selectively urge the head 43 forwardly and rearwardly along the first 35 and second 39 sets of rollers. The head piston 91 may be a hydraulic piston of any conventional design.

A pair of conveyor frames 99 is each coupled to an associated one of the first 83 and second 85 lateral sides of the rear portion 41 of the head 43. The pair of conveyor frames 99 are positioned within an interior of the head 43. Continuing, the pair of conveyor frames 99 are each positioned below and are coextensive with an associated one of each of the pair of V-shaped tracks. Finally, a top arm 100 of each of the pair of conveyor frames 99 has a C-shaped cross section taken perpendicular to a line extending through a leading end 102 and a hind end 104 of each of the top arms 100 of the pair of conveyor frames 99.

A rack gear 106 is coupled to a lower side 108 of the top arm 100 of a first one of the pair of conveyor frames 110. The rack gear 106 is coextensive with the first conveyor frame 110. Additionally, the rack gear 106 may be a rack gear of any conventional design. A second conveyor belt 112 is operationally coupled to the head 43. The second conveyor belt 112 may be a mechanical conveyor belt of any conventional design.

A pair of conveyor rollers 114 is coupled to and extends laterally away from the second conveyor belt 112. The pair of conveyor rollers 114 may have a diameter between 5 cm and 7 cm. Further, the pair of conveyor rollers 114 are evenly spaced apart and positioned proximate a back end 116 of the second conveyor belt 112. The pair of conveyor rollers 114 comprises a pair of sets of the conveyor rollers 118. Each of the pair of sets of conveyor rollers 118 is coupled to an associated one of a first flanking side 120 and a second flanking side 122 of the second conveyor belt 112.

Each of the pair of sets of conveyor rollers 118 is movably positioned within an associated one of the top arms 100 of the pair of conveyor frames 99. The second conveyor belt 112 is movably coupled to the head 43 so a first end 124 of the second conveyor belt 112 is positioned proximate the front side 81 of the front portion 49 of the head 43. The second conveyor belt 112 is positioned beneath the forward portion 96 of the first conveyor belt 92. The first conveyor belt 92 transports the poultry to the second conveyor belt 112. A second belt motor 126 is coupled to the second conveyor belt 112. Further, the second belt motor 126 may be a hydraulic motor of any conventional design. The second belt motor 126 may be one of a pair of the second belt motors 126 each coupled to opposite sides of a drive portion 128 of the second conveyor belt 112. A rotation one of the second belt motors 130 is rotatably coupled to a drive roller 132 of the second conveyor belt 112. The second conveyor belt 112 delivers the poultry to a container 134.

Figure 1:
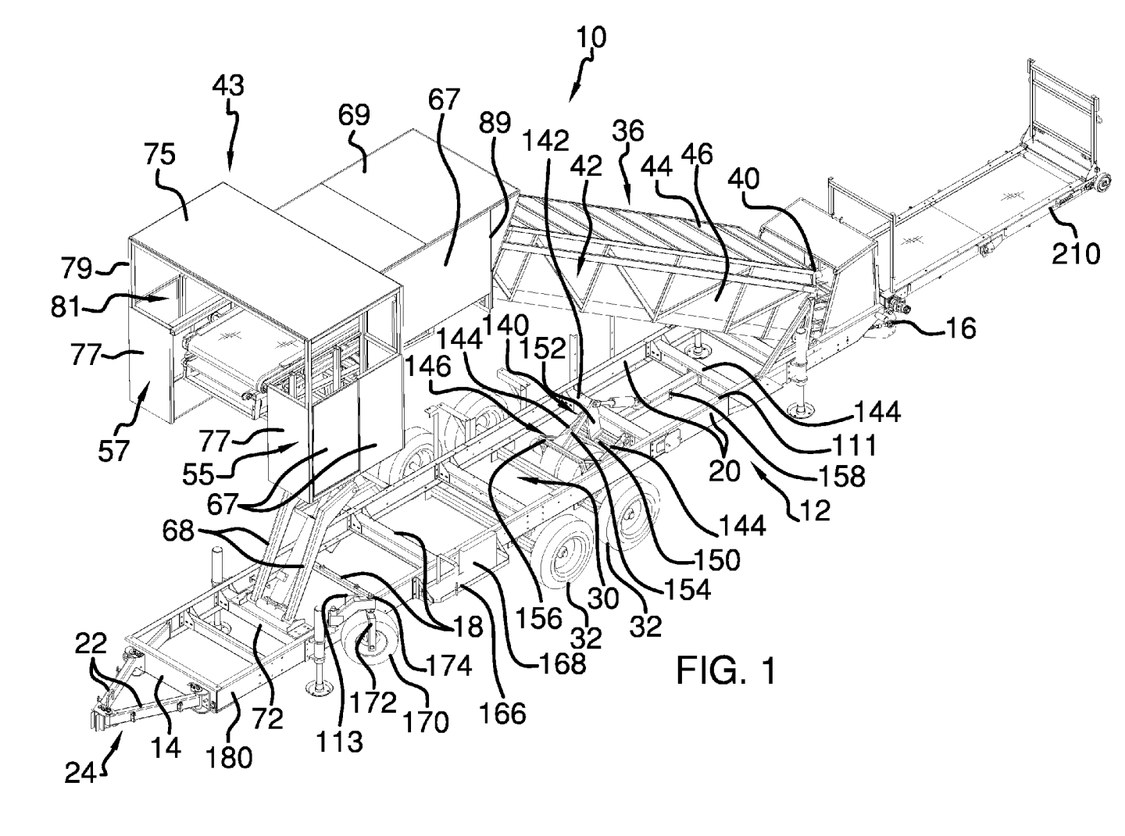
FIG. 1 is a top perspective view of a poultry loading assembly according to an embodiment of the disclosure.
Figure 2:
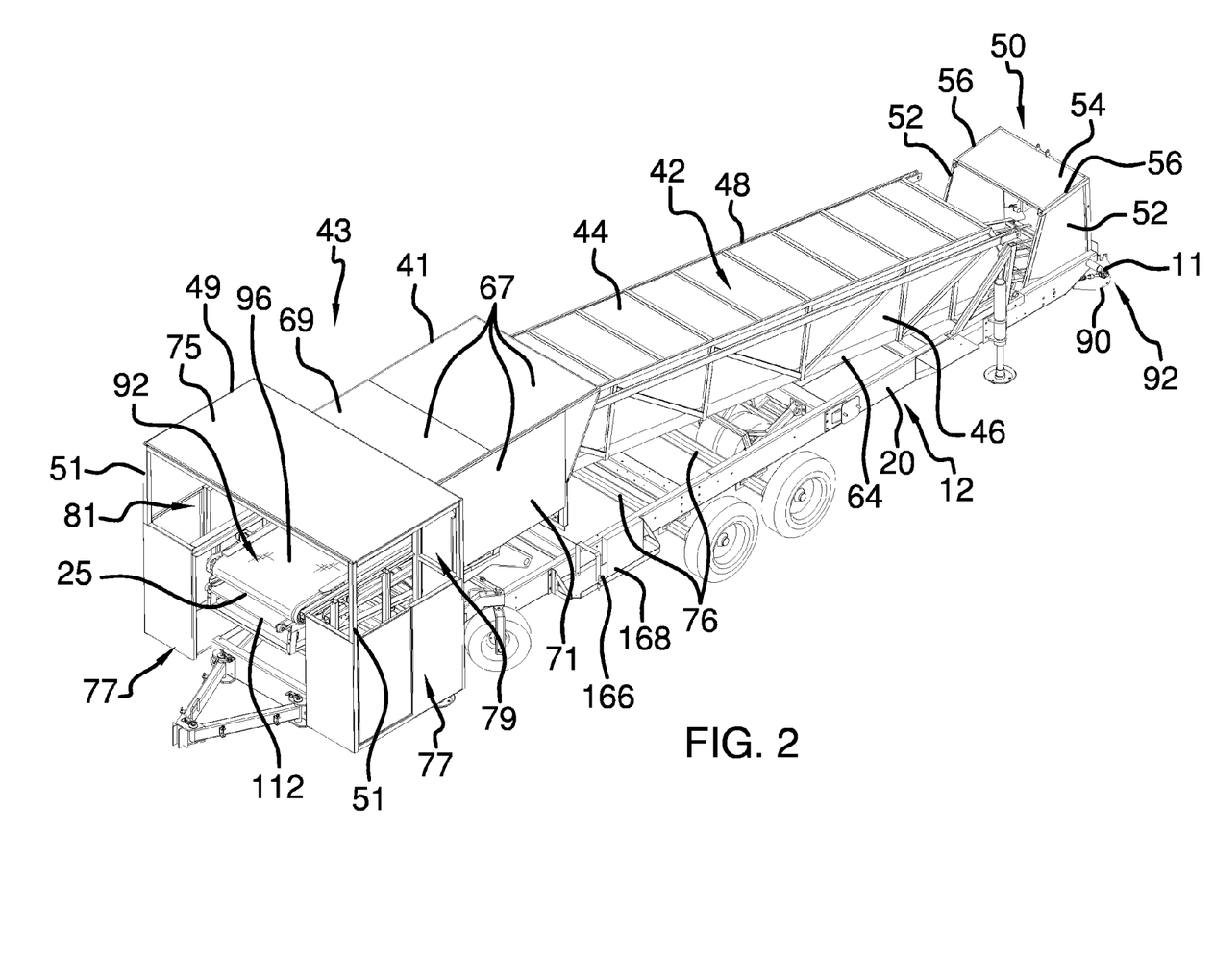
FIG. 2 is a front perspective view of an embodiment of the disclosure.
Figure 3:
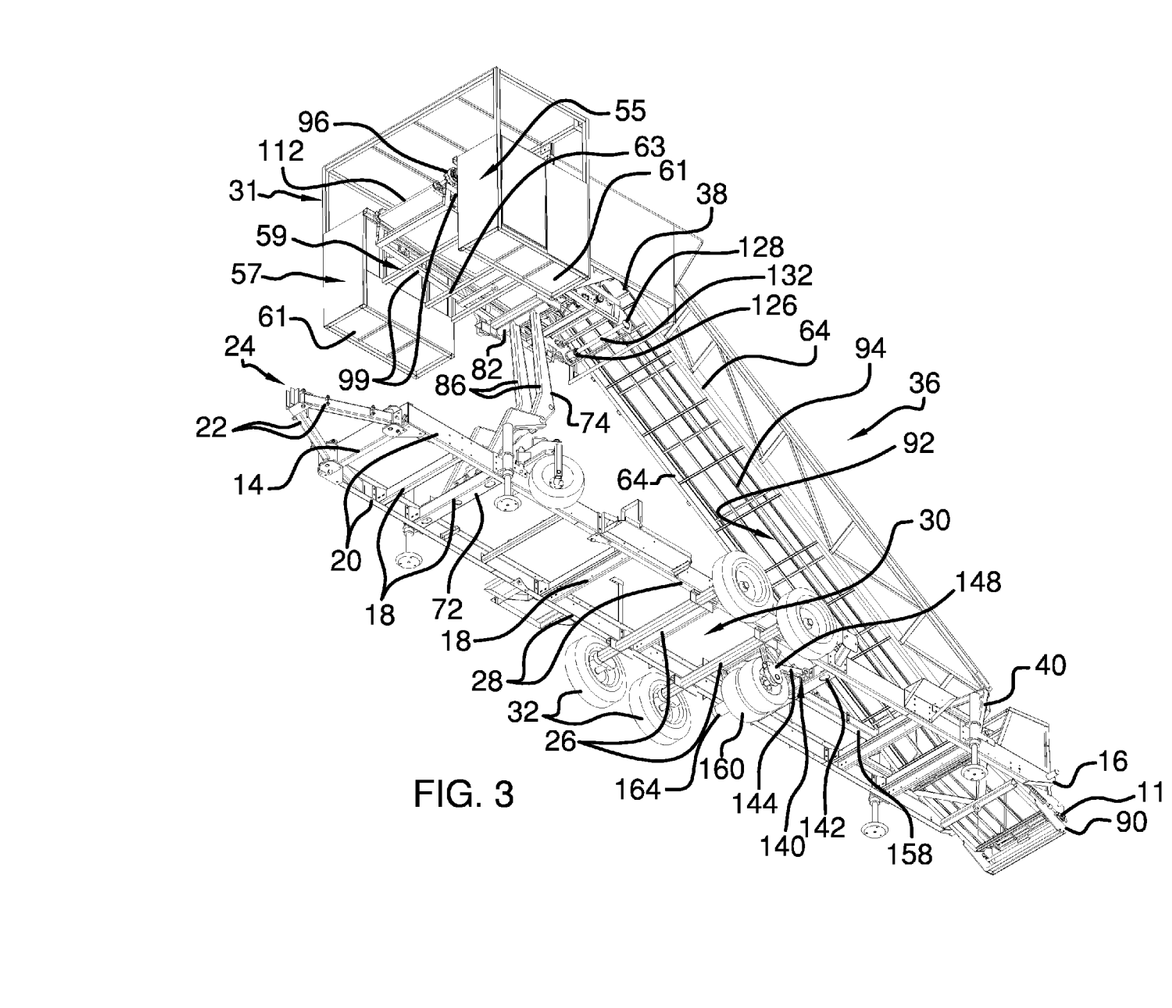
FIG. 3 is a bottom perspective view of an embodiment of the disclosure.
Figure 4:
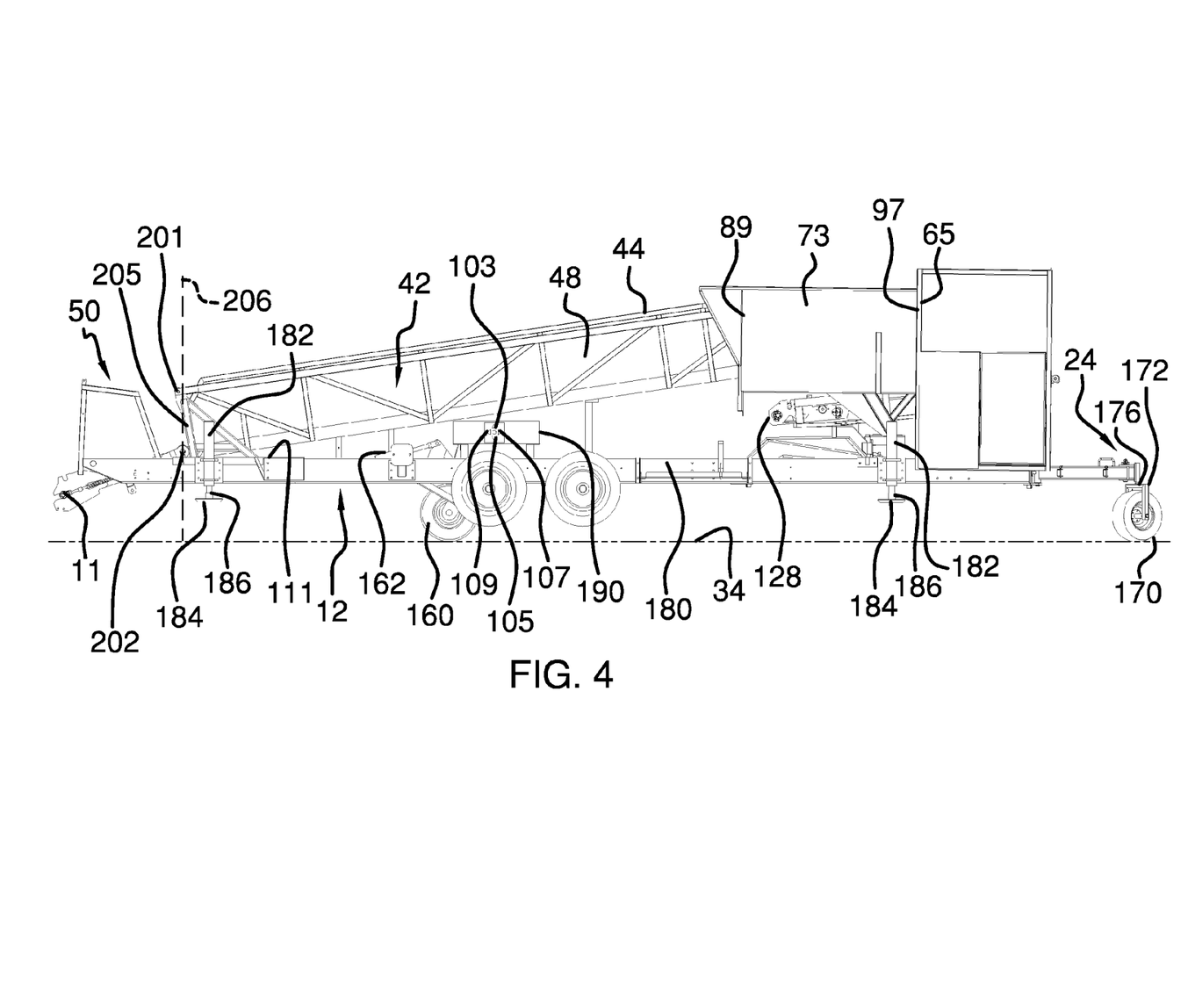
FIG. 4 is a right side view of an embodiment of the disclosure.
Figure 5:
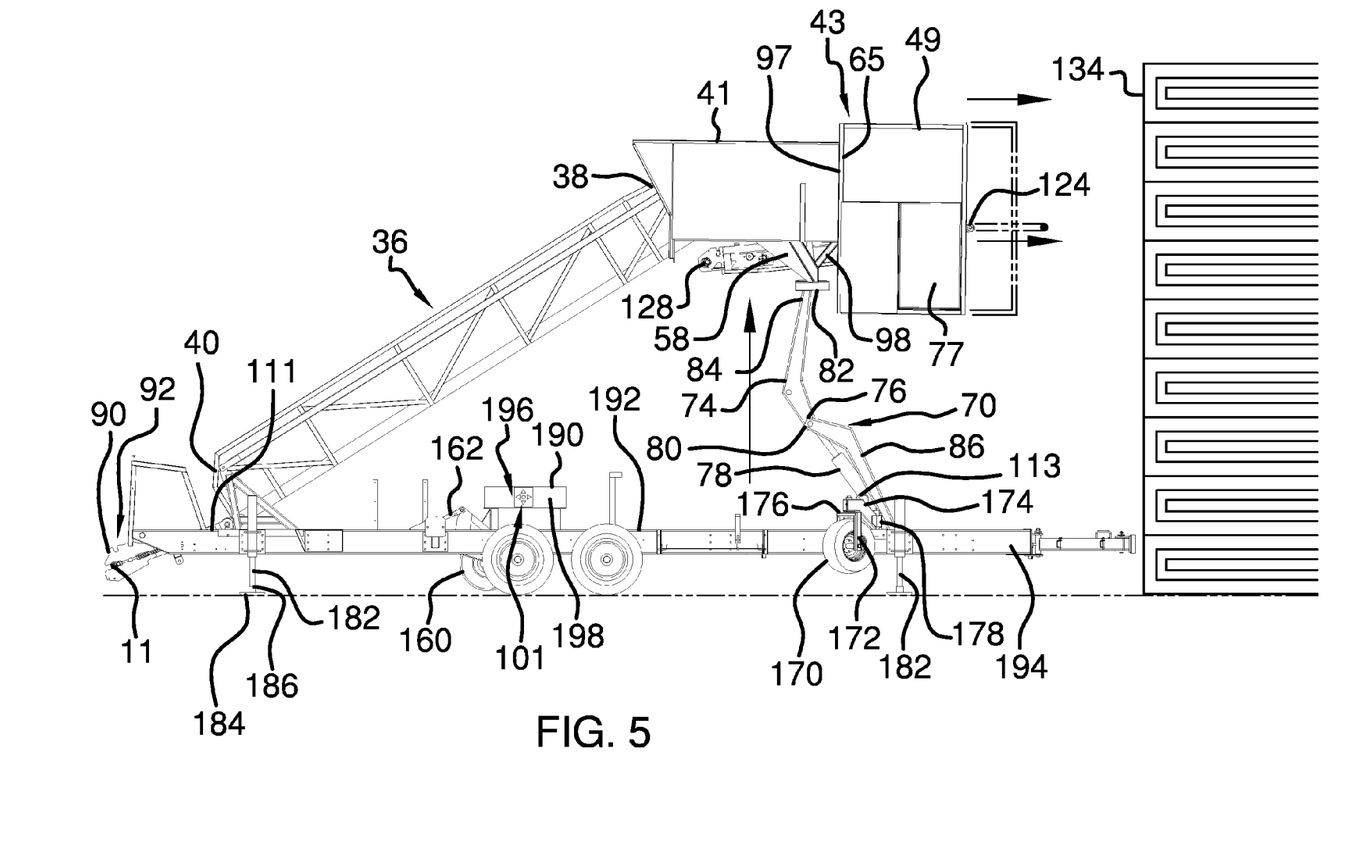
FIG. 5 is a right side view of an embodiment of the disclosure.
Figure 6:
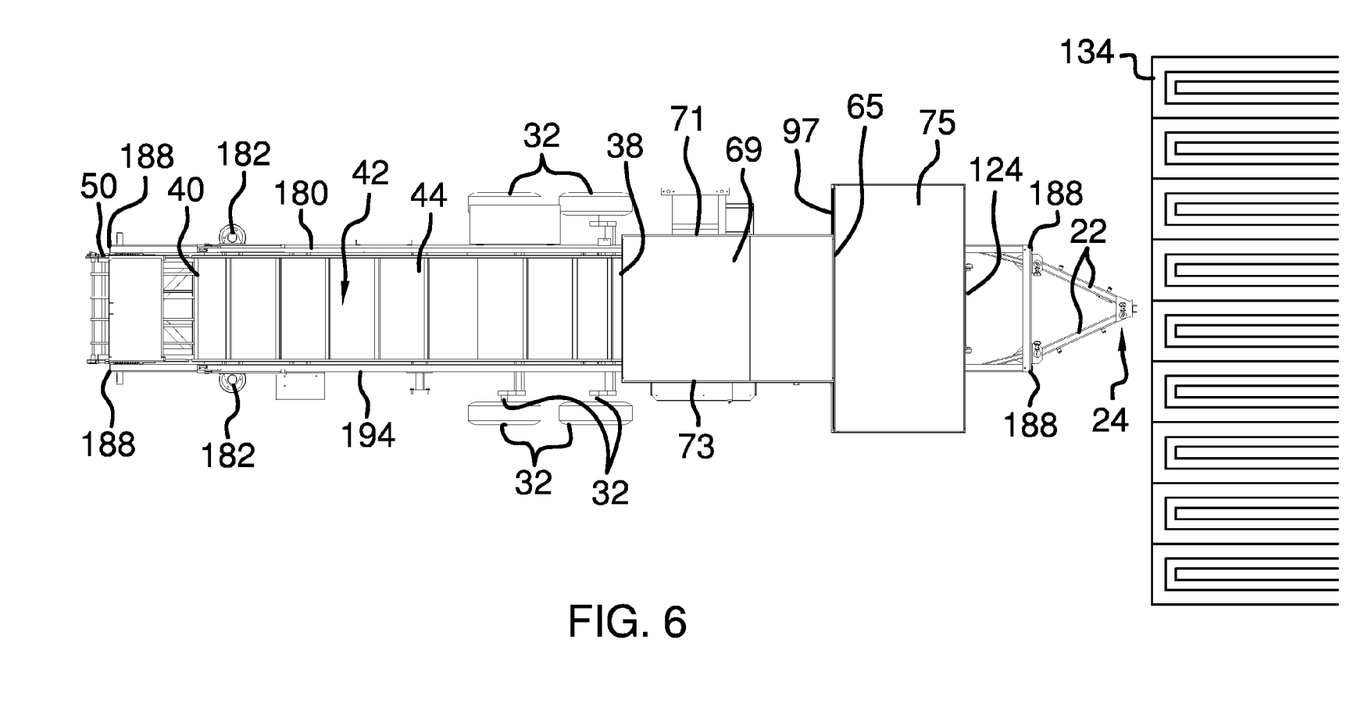
FIG. 6 is a top view of an embodiment of the disclosure.
Figure 7:
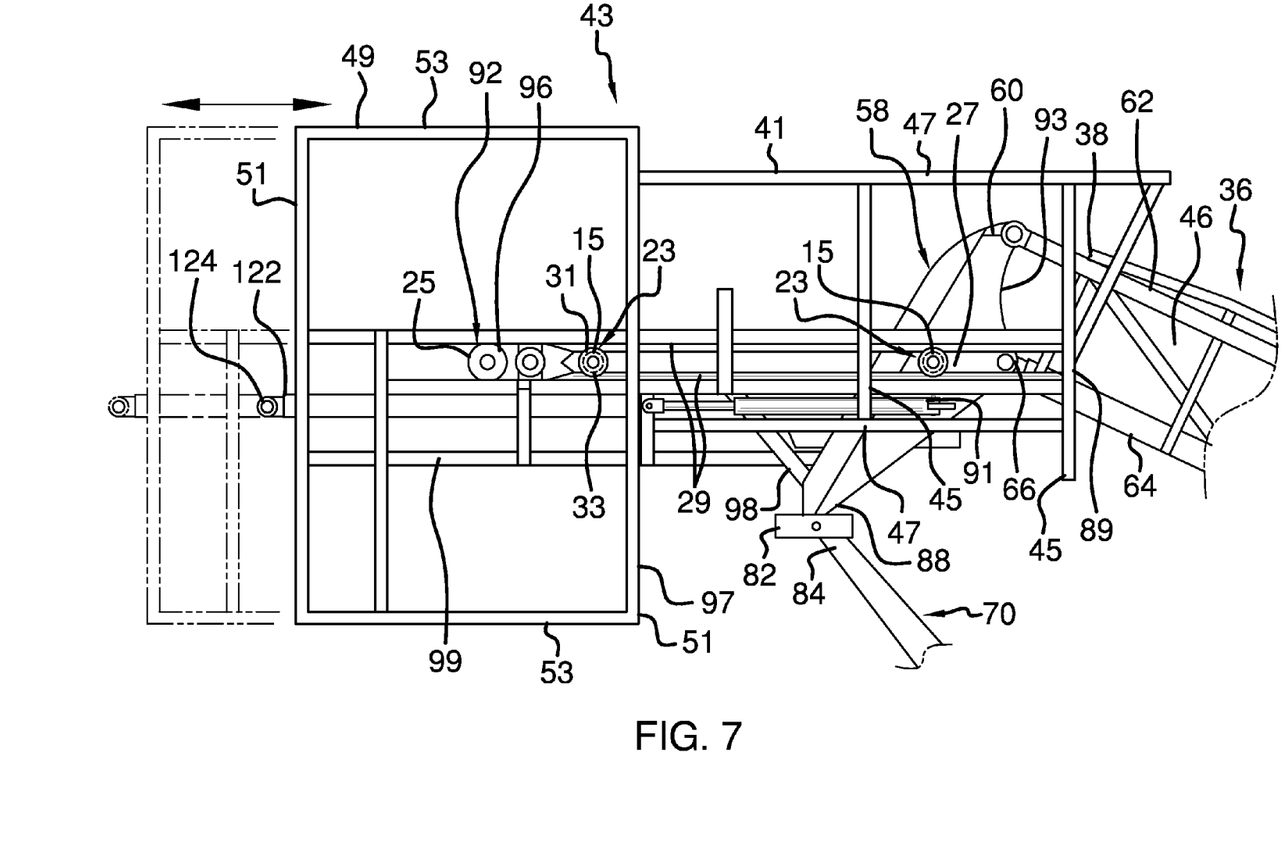
FIG. 7 is a left side cutaway view of an embodiment of the disclosure.
Figure 8:
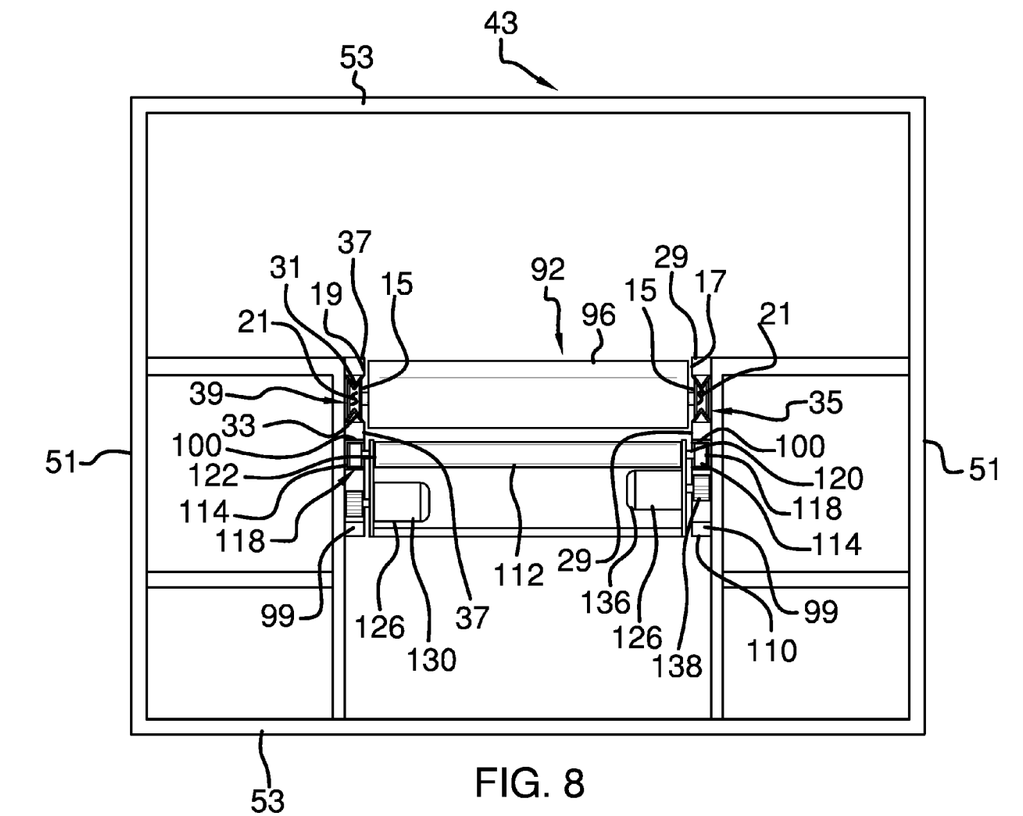
FIG. 8 is a front side cutaway view of an embodiment of the disclosure.
Figure 9:
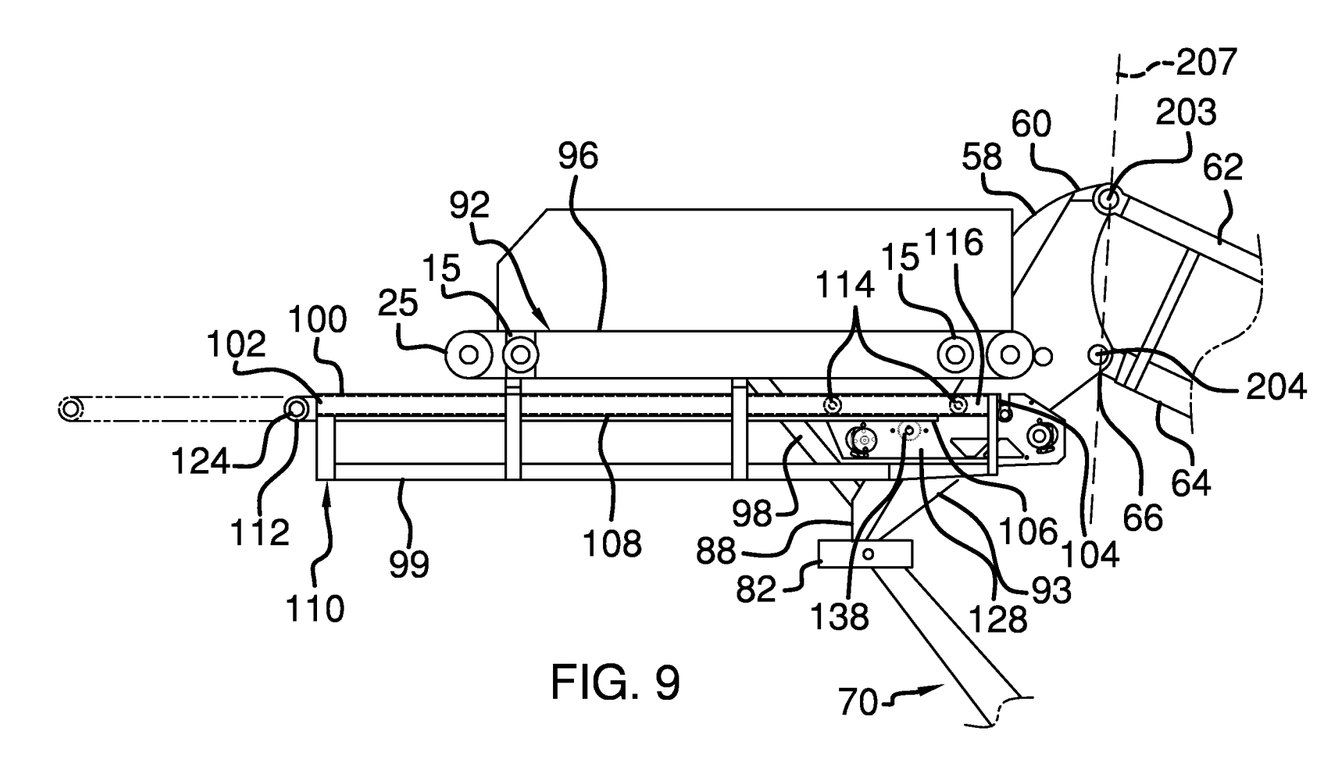
FIG. 9 is a right side detail view of an embodiment of the disclosure, having portions thereof removed for clarity.
Figure 10:
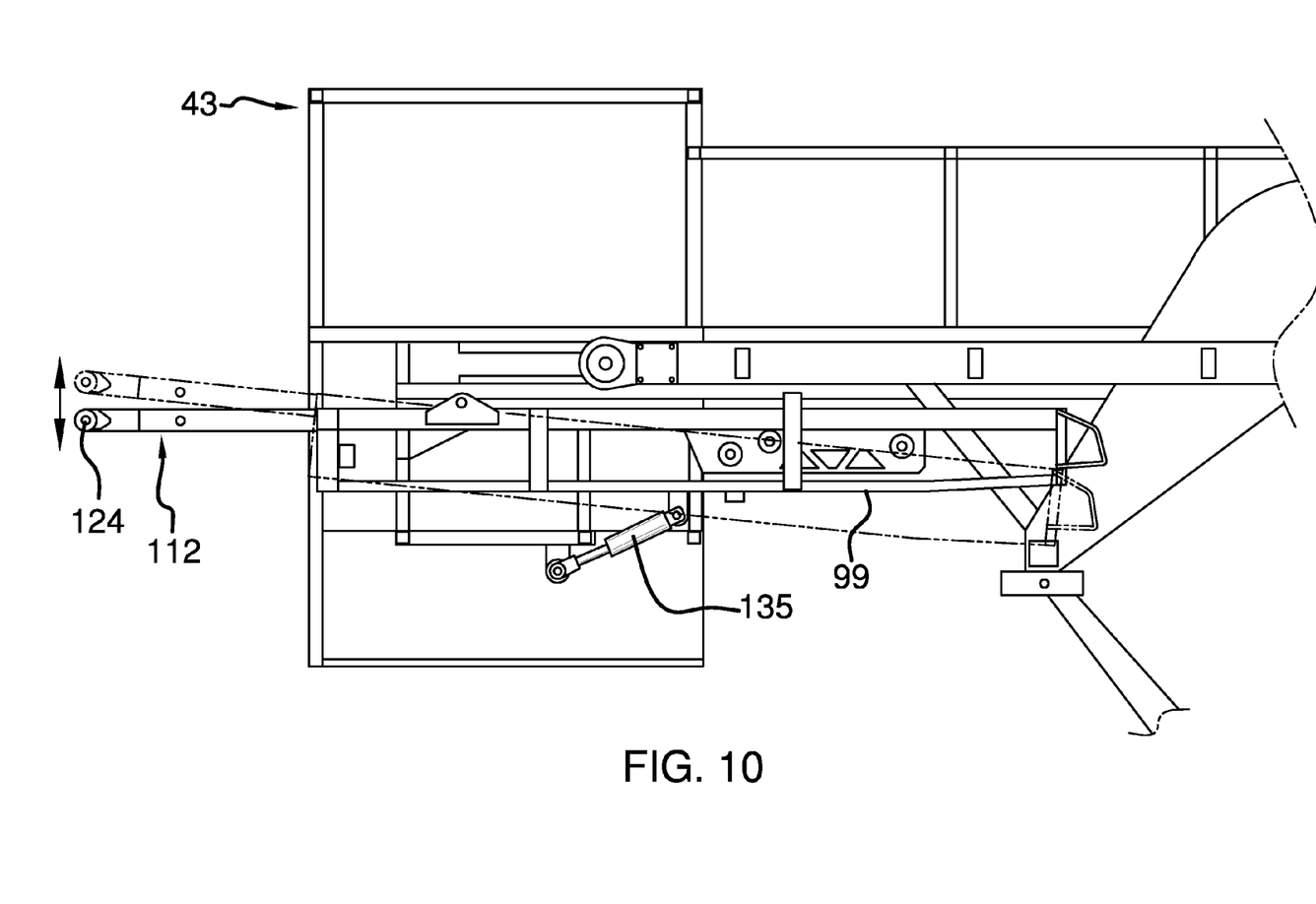
FIG. 10 is a left side detail view of an embodiment of the disclosure having portions thereof removed for clarity.
Figure 11:
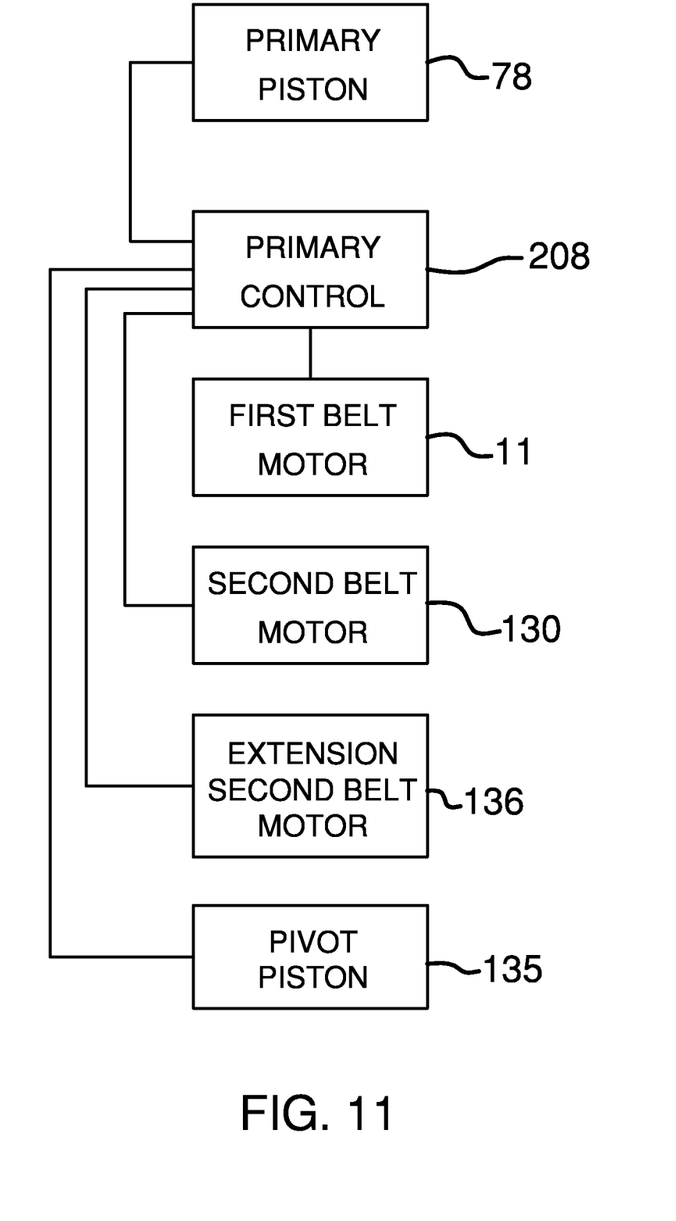
FIG. 11 is a schematic view of an embodiment of the disclosure.

An extension one of the second belt motors 136 is rotatably coupled to a pinion gear 138 on the drive portion 128 of the second conveyor belt 112. The pinion gear 138 engages the rack gear 106. The extension second belt motor 136 selectively moves the second conveyor belt 112 forwardly and rearwardly along the head 43. Moreover, the second conveyor belt 112 is selectively orientated with the container 134 so the second conveyor belt 112 safely delivers the poultry into the container 134. More particularly, a pivot piston 135 is mechanically coupled to the second conveyor belt 112, and which specifically may be attached to the conveyor frames 99, and is actuated to selectively pivot the second conveyor belt for fine positioning thereof as is shown in FIG. 10. This is done particularly for ensuring that the second conveyor belt 112 is level with a container without having to tilt the head 43 which remains level. It should be understood, the rack gear 106, pinion gear 138 and second belt motors 136 may be replaced with a cylinder and piston combination.

A swing arm 140 is movably coupled to a drive one of the plurality of lateral arms 142 of the primary frame 12. The swing arm 140 comprises a pair of longitudinal members 144 hingedly coupled to and extending forwardly from the drive lateral arm 142 of the primary frame 12. An engaging portion 146 of the swing arm 140, which may be U-shaped, is coupled to and extends upwardly from a free end 148 of each of the pair of longitudinal members 144 of the swing arm 140. A lateral member 150 of the swing arm 140 is coupled to and extends between each of the pair of longitudinal members 144 of the swing arm 140. The lateral member 150 of the swing arm 140 is positioned proximate the drive lateral arm 142 of the primary frame 12. A centrally positioned piston member 152 is coupled to and extends upwardly from the lateral member 150 of the swing arm. Additionally, a support member 154 extends between the centrally positioned piston member 152 and a central member 156 of the U-shaped engaging portion 146 of the swing arm 140. A support member 158 extends between the drive lateral member 142 and an adjacent lateral member 18 of the primary frame 12. Finally, a pair of drive wheels 160 is rotatably coupled between the pair of longitudinal members 144 of the swing arm 140.

A drive piston 162 is coupled between the piston member 158 and the support member 154. The drive piston 162 selectively moves the pair of drive wheels 160 into a deployed position so the pair of drive wheels 160 lifts the plurality of wheels 32 upwardly from the support surface 34. Additionally, the drive piston 162 selectively moves the pair of drive wheels 160 into a stored position so the plurality of wheels 32 are lowered to the support surface 34. Finally, the drive piston 162 may be a hydraulic piston of any conventional design. A drive motor 164 is coupled to the pair of drive wheels 160. The drive motor 164 rotates the pair of drive wheels 160 when the pair of drive wheels 160 is in the deployed position. Further, the pair of drive wheels 160 selectively moves the assembly 10 along the support surface 34. The drive motor 164 may be a hydraulic motor of any conventional design. The drive motor 164 allows the assembly 10 to be moved without being coupled to a vehicle.

A pump 166 is coupled to the primary frame 12. The pump 166 is fluidly coupled to the first belt 11, the rotation second belt 130, the extension second belt 136 and the drive motors 164. The pump 166 supplies a fluid pressure to each of the first belt 11, the rotation second belt 130, the extension second belt 136 and the drive motors 164. The pump 166 may be a hydraulic pump of any conventional design. A master motor 168 is coupled to the primary frame 12 and is coupled to the pump 166. The master motor 168 actuates the pump 166 so the pump 166 produces the fluid pressure. The master motor 168 may comprise an internal combustion engine of any conventional design.

A steering wheel 170 is rotatably coupled to a U-shaped steering arm 172. An engaging arm 174 is coupled to and extends away from a middle portion 176 of the U-shaped steering arm 172. The engaging arm 174 is selectively positionable in the V-shaped hitch 24 so the steering wheel 170 is positioned in a deployed position. The steering wheel engages the support surface when the steering wheel is in the deployed position. The steering wheel 170 engages the support surface 34 when the pair of drive wheels 160 is positioned in the deployed position. A handle 113 is coupled to and extends upwardly from the engaging arm 174. A user grips the handle 113 and manipulates the steering wheel 170 to steer the primary frame 12 when the pair of drive wheels 160 moves the primary frame 12 along the support surface 34. A steering receiver 178 is coupled to a first one of the pair of longitudinal arms 180 of the primary frame 12. The steering receiver 178 is positioned proximate the primary scissor 70. The steering wheel 170 is positionable in a stored position that has the engaging arm 174 coupled to the steering receiver 178. The steering wheel 170 is positionable in the stored position so the steering wheel 170 is spaced upwardly from the support surface 34.

A plurality of legs 182 is movably coupled to each of the pair of longitudinal arms 20 of the primary frame 12 and a circular base 184 is coupled to a bottom end 186 of each of the plurality of legs 182. Each of the plurality of legs 182 is positioned proximate an associated one of four corners 188 of the primary frame 12. Each of the plurality of legs 182 is positionable in a deployed position so the circular base 184 engages the support surface 34. The plurality of legs 182 is each positionable in a stored position so the circular base 184 is spaced away from the support surface 34. Additionally, the plurality of legs 182 are positionable in the deployed position when the pair of drive wheels 160 is positioned in the stored position. The plurality of legs 182 retains the assembly 10 stable in an proper orientation.

A control 190 is coupled to a top 192 of a second one of the pair of longitudinal arms 194 of the primary frame 12. The control 190 is positioned proximate the plurality of wheels 32 for controlling the legs 182, which may be hydraulically or pneumatically actuated, and the drive motors 164. A plurality of actuators 196 is coupled to a front side 198 the control 190. The plurality of actuators 196 comprise a plurality of directional arrows 101 that are selectively engaged by the user. Each of an upward 103 and a downward arrow 105 actuates legs 182 upwardly or downwardly. Continuing, each of a forward 107 and a rearward 109 arrow actuates the drive motor 164 so the pair of drive wheels 160 moves the assembly 10 forwardly or rearwardly along the support surface 34. A separate and conventional primary control 208 will be placed within the head 43 for actuation by an operator of the assembly 10 for control of the first belt motor 11, the second belt motor 130, the extension second belt motor 136, the pivot piston 135, the primary piston 78, and, potentially, the drive motors 164. The primary control will therefore control the angle of the chute and the movement of poultry throughout the assembly 10.

In use, the assembly 10 is positioned proximate an area to deliver the poultry and the pair of drive wheels 160 and the steering wheel 170 are each positioned in the deployed position. The assembly 10 is driven into a selected position. Once the assembly 10 is positioned at the selected position, the plurality of legs 182 are positioned in the deployed position. Additionally, each of the pair of drive wheels 160 and steering wheel 170 are positioned in the stored position.

The chute 36 is positioned at a desired angle with respect to the primary frame 12 so that the head 43 is generally aligned with a desired container 134 mounted on a semi-trailer bed. The head 43 is urged forwardly or rearwardly along the front portion 96 of the first conveyor belt 92 so the head 43 is positioned proximate the container 134. The second conveyor belt 112 is urged forwardly or rearwardly relative to the head 43 so that first end 124 of the second conveyor belt 112 is positioned at a selected point with respect to the container 134. Generally the conveyor belt 112 is extended into the container. The angle of second conveyor belt 112 may be altered to all for fine positioning adjustments with respect to the container 134 so the poultry are safely delivered into the container 134. This is done while retaining the head 43 in a horizontal orientation regardless of the angle of the second conveyor belt 112 or the angle of the chute 34.

When the assembly 10 is being operated, poultry, and in particular turkeys, are loaded onto the first conveyor belt 92 for movement towards the head 43. This may be facilitated by a pre-loader 210, as is known in the art, which is placed at the exit of the turkey holding facility and onto which the turkeys are corralled. The first conveyor belt 92 delivers the turkeys to the second conveyor belt 112 which in turn is extended into one of the containers 134 for depositing of the turkeys into that container. The second conveyor belt 112 is then retracted and extended into a different container 134 for depositing turkeys into that container. The first 92 and second 112 conveyor belts are stopped when needed to prevent the congestion of turkeys in the head 43. The second conveyor belt 112, as stated above, With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:
1. A poultry loading assembly configured to load the poultry into a container wherein said assembly is selectively orientated with the container, said assembly comprising:
   a primary frame;
   a chute being operationally coupled to said primary frame, said chute being positionable at a selected angle with respect to said primary frame;

a primary scissor operationally coupled between said primary frame and said chute, said primary scissor being actuated to lower or lift said chute;

a first conveyor belt being rotatably mounted on said chute and being configured for receiving poultry thereon proximate a loading area;

a head operationally coupled to said chute opposite the loading area, said head being continuously retained in a parallel orientation with a support surface, said head being selectively positionable proximate the container, said head being selectively movable toward or away from the container; and a second conveyor belt operationally coupled to said head, said first conveyor belt being configured to transport the poultry to said second conveyor belt and thereafter said second conveyor belt being configured to transport the poultry into the container;

a drive wheel operationally coupled to said primary frame;

a drive motor coupled to said drive wheel wherein said drive motor moves said drive wheel to selectively move said primary frame along the support surface;

a swing arm movably coupled to a drive one of a plurality of lateral arms of said primary frame;

said drive wheel being rotatably coupled to said swing arm;

a drive piston coupled between said primary frame and said swing arm wherein said drive piston selectively moves said drive wheel into a deployed position wherein said drive wheel lifts a plurality of wheels upwardly from the support surface, said drive piston selectively moving said drive wheel into a stored position wherein said plurality of wheels are lowered to the support surface; and said drive motor rotating said drive wheel when said drive wheel is in said deployed position.

2. The poultry loading assembly according to claim 1, wherein said second conveyor belt is selectively extended outwardly from or into said head.

3. The poultry loading assembly according to claim 1, wherein an angle of said second conveyor belt may be altered with respect to horizontal.

4. The poultry loading assembly according to claim 3, wherein an angle of said second conveyor belt may be altered with respect to said head.

5. The poultry loading assembly according to claim 1, further including;
a first belt motor coupled to said first conveyor belt wherein said first belt motor moves said first conveyor belt; and
a second belt motor coupled to said head, said second belt motor being operationally coupled to said second conveyor belt wherein said second belt motor moves said second conveyor belt.

6. The poultry loading assembly according to claim 1, further including a steering wheel operationally coupled to said primary frame, said steering wheel being moved by a user wherein the user steers the primary frame when said drive wheel moves said primary frame along the support surface.

7. The poultry loading assembly according to claim 1, further comprising:
said primary frame being elongated along a line extending between a fore end and a posterior end of said primary frame;
said primary frame comprising a plurality of lateral arms of said primary frame coupled to and extending between each of a pair of longitudinal arms of said primary frame such that said plurality of lateral arms are spaced apart from each other and distributed between said front and back ends of said primary frame.

8. The poultry loading assembly according to claim 1, further comprising a pair of axles coupled to a bottom of each of a pair of longitudinal arms of said primary frame proximate a middle of said primary frame wherein said pair of axles each extends laterally beyond each of said longitudinal arms of said primary frame, a plurality of wheels each coupled to an associated one of a pair of free ends of an associated one of a pair of axles wherein said primary frame is rolled along the support surface.

9. The poultry loading assembly according to claim 1, wherein said chute is elongated along a line extending between a front end and a back end of said chute, said chute being hingedly coupled to a top of said primary frame proximate a back end of said primary frame wherein said chute is positionable at a selected angle with respect to said primary frame.

10. The poultry loading assembly according to claim 1, further including:
a bottom portion of said primary scissor being hingedly coupled to and extending upwardly from one of a plurality of lateral arms of said primary frame defining an actuator lateral arm;
an upper portion of said primary scissor being hingedly to said bottom portion of said primary scissor;
a primary piston coupled between said actuator lateral arm of said primary frame and a bottom of said upper portion of said primary scissor wherein said primary piston selectively extends and collapses said primary scissor with respect to said primary frame;
a top mount coupled to and extending between a top end of each of a pair of arms of said upper portion of said primary scissor; and
a bottom end of each of a pair of scissor mounts being pivotally coupled to said top mount.

11. The poultry loading assembly according to claim 1, wherein said first conveyor belt includes:
a drive portion adjacent to a back end of said chute; and
a central portion extending between a back and a front end of said chute; and
a forward portion extending forwardly from said front end of said chute, said forward portion being continuously retained in an orientation parallel with the support surface.

* * * * *